April 15, 1947.   R. E. MORRISSETTE   2,419,189
SERRATING TOOL
Filed Oct. 25, 1944

INVENTOR.
Raymond E. Morrissette
BY
Walter C. ___
Attorney.

Patented Apr. 15, 1947

2,419,189

UNITED STATES PATENT OFFICE 2,419,189

SERRATING TOOL

Raymond E. Morrissette, Indian Orchard, Mass., assignor of one-half to Everett T. Morrissette, Indian Orchard, Mass.

Application October 25, 1944, Serial No. 560,336

2 Claims. (Cl. 82—4)

This invention relates to improvements and is directed more particularly to improvements in tools for machining surfaces surrounding cylinder bores.

The novel features of the invention are directed to the provision of a tool for performing a machining operation on and adjacent a bore such as the cylinder bore of an internal combustion engine.

The novel features of the invention may be adapted for many and various uses and while it will be described in connection with a cylinder bore it is not to be limited thereto.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Figure 1:
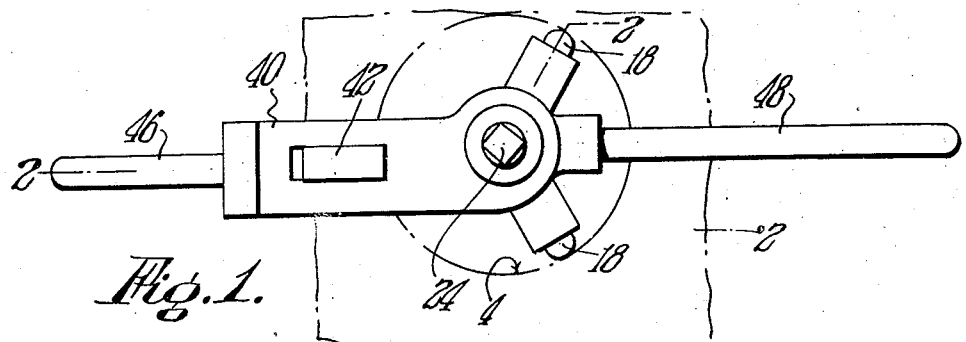
Fig. 1 is a plan view of a tool embodying the novel features of the invention.

Referring now to the drawings more in detail the invention will be fully described.

A portion of an internal combustion engine is shown by dot-dash lines 2 and a cylinder bore is shown at 4. The tool of this application is adapted to cut or reform a plurality of concentric grooves or serrations around the bore 4 on the surface 6. The grooves or serrations may take any form desired.

Figure 3:
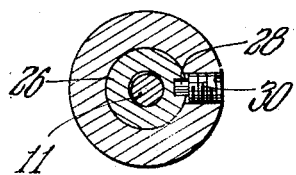
Fig. 3 is an enlarged sectional plan view on the line 3—3 of Fig. 2.

A support 10 is provided which has an axial bore 12. An upper and a lower set of hubs 14 and 16 have slidable therein plungers 18 and 20. An actuator 22 is reciprocable in the bore 12 and has a squared upper end 24 to receive a wrench for rotating the same. A plug 26 is slidable in the lower end of the support 10 and is held against turning by a pilot 28 of a screw 30 which pilot is slidably received in a longitudinal slot thereof as shown in Fig. 3.

Figure 2:
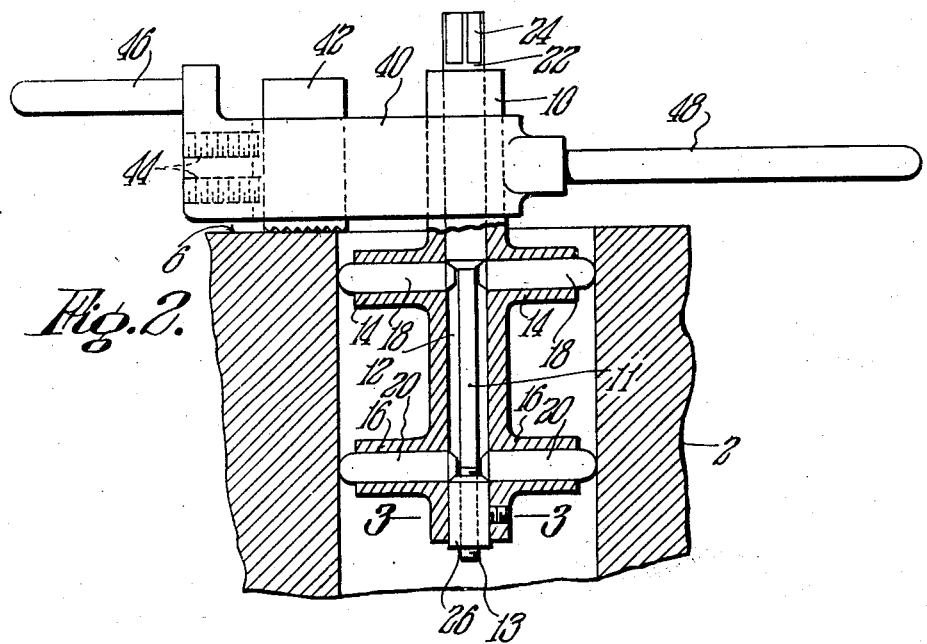
Fig. 2 is a partial sectional elevational and side elevational view taken on the line 2—2 of Fig. 1.

The inner ends of the plungers 18 and 20 are beveled as shown in Fig. 2. The lower end of the member 22 and upper end of member 26 are also beveled as shown.

A stem 11 extends downwardly from the member 22 and its lower end 13 is in threaded engagement with an internal thread of the member 26.

The outer ends of the plungers may be rounded as shown for engaging the wall of a cylinder bore. As the member 22 is rotated in one direction, the member 26 is drawn thereto so that the beveled surfaces of the members 22 and 26 act on the inner ends of the plungers to move the plungers outwardly which causes the support to be secured in the bore with its longitudinal axis disposed on the axis of the bore.

In this way the support may be secured in any bore for which it is made. By rotating member 22 in an opposite direction the plungers are released.

An arm 40 is rotatable on the upper end of the support 10 and it carries a cutting tool 42. The tool 42 may be disposed in a slot 44 of the arm 40 and held therein by a screw or screws 44.

The lower edge of the cutting tool is formed with a cutting edge or edges which will provide the desired shape and number of grooves or serrations.

Manually engageable members 46 and 48 are provided so that with the support secured in a cylinder bore the arm may be rotated so that the cutting edge of the tool 42 will act on and cut or reform grooves or serrations in the part 2 around the bore 4.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A tool mechanism for forming serrations on the upper side of an engine block and concentrically around a cylinder bore therein comprising in combination, a support for inserting axially in a cylinder bore having a longitudinal bore and provided with upper and lower sets of hubs, the hubs of the sets extending radially from and spaced circumferentially of the support and provided with bores extending radially of the bore of said support, a plug reciprocable and non-rotatable in the lower end of the bore of the support having an internal screw-threaded bore, an actuator having an upper portion rotatable and reciprocable in the bore of the support having a lower threaded end engageable with the screw-threaded bore of the plug whereby as the actuator is rotated in opposite directions the plug and upper portion of the actuator are moved towards and away from one another, plungers slidable in the bores of the hubs having outer ends adapted to bear against the walls of a cylinder bore, means associated with inner ends of the plungers and the actuator and plug operable when the plug and actuator are moved towards one another to move the plungers outwardly in their bores for engaging the walls of a cylinder bore to hold said support axially thereof, an arm swingable on the upper end of said support for sweeping over the upper surface of an engine block around a cylinder bore therein having an opening therethrough for a tool, a tool in said opening having a work face and means to clamp said tool in said opening, and manually engageable means extending from said arm for rotating the same.

2. A tool mechanism for forming serrations on the upper side of an engine block and concentrically around a cylinder bore therein comprising in combination, a support for inserting axially in a cylinder bore having a longitudinal bore and provided with upper and lower sets of hubs, the hubs of the sets extending radially from and spaced circumferentially of the support and provided with bores extending radially of the bore of said support, a plug reciprocable and non-rotatable in the lower end of the bore of the support having an internal screw-threaded bore, an actuator having an upper portion rotatable and reciprocable in the upper portion of the bore of the support and a reduced stem portion depending therefrom provided with a screw-threaded lower end engaging the threaded bore of the plug, plungers slidable in the bores of the hubs having outer ends adapted to engage the walls of a cylinder bore and provided with inner conical ends, the upper inner end of the plug and lower end of the upper portion of the actuator having opposed faces which are complemental to and below and above the inner conical ends of the plungers of the lower and upper sets thereof whereby as the actuator is rotated in one direction and the plug and actuator are moved towards one another they act on and urge the plungers outwardly radially so that their outer ends engage the walls of a cylinder bore and hold the support on the axis of said bore, an arm rotatable on the upper end of said support for sweeping the upper side of an engine block around a cylinder bore and having an opening for a tool therein, a tool in said opening, means to hold said tool in said opening, and manually engageable means extending from said arm for rotating the same.

RAYMOND E. MORRISSETTE.

REFERENCES CITED

The following references are of record in the file of this patent:

UNITED STATES PATENTS

| Number | Name | Date |
| --- | --- | --- |
| 764,341 | Bond | July 5, 1904 |
| 1,796,208 | Mahoney | Mar. 10, 1931 |